Figure 1:
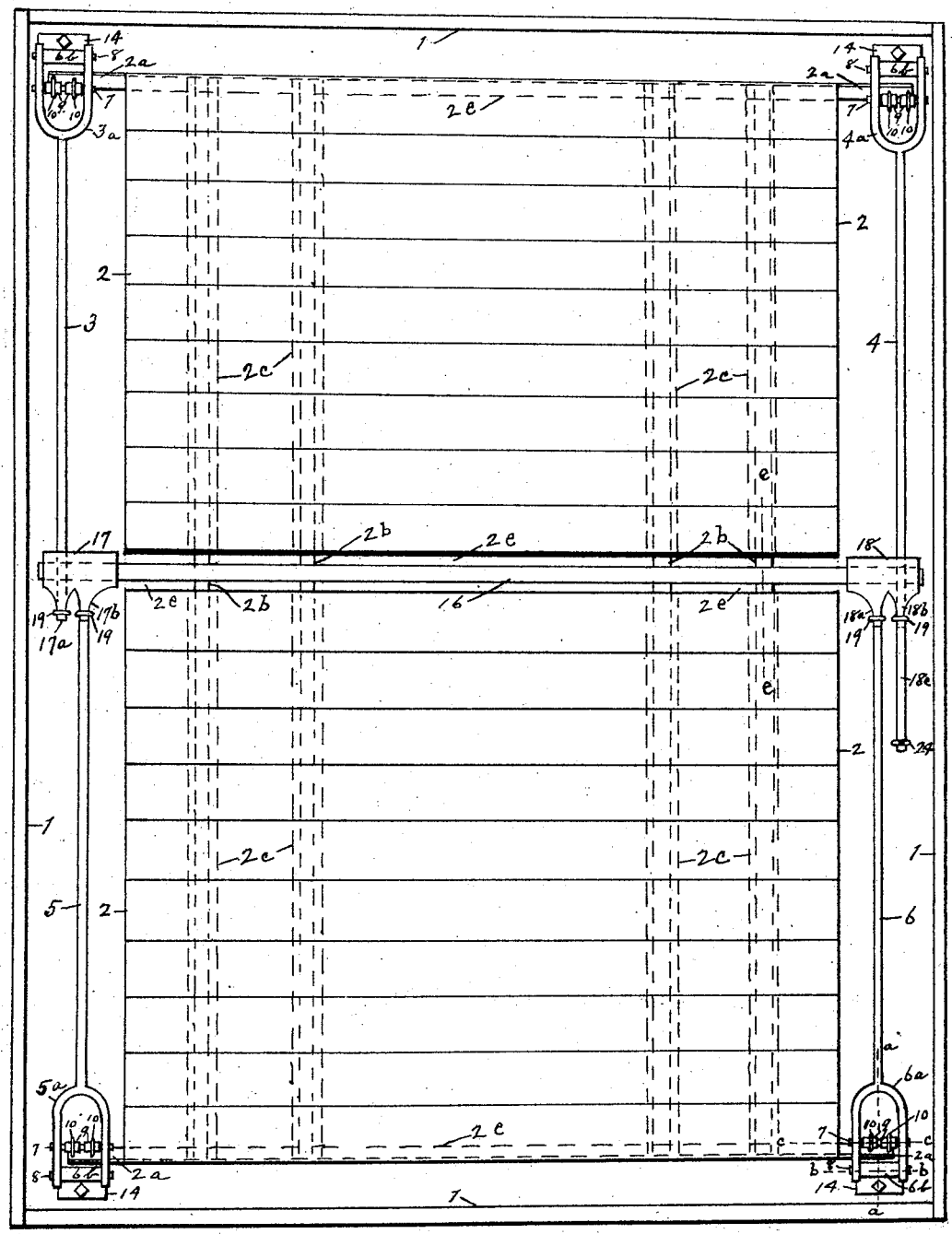

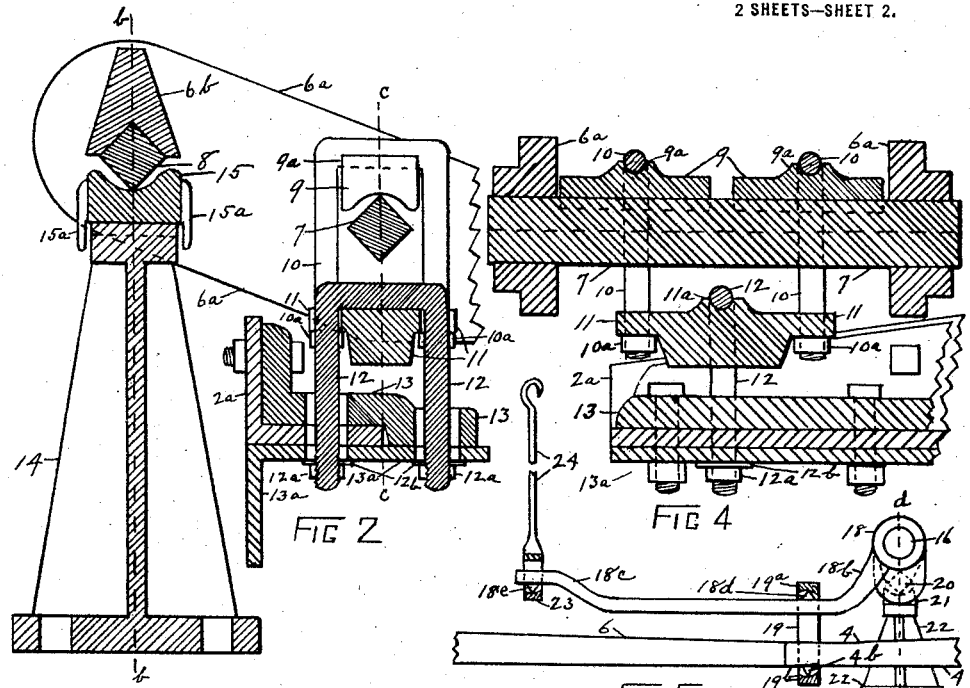
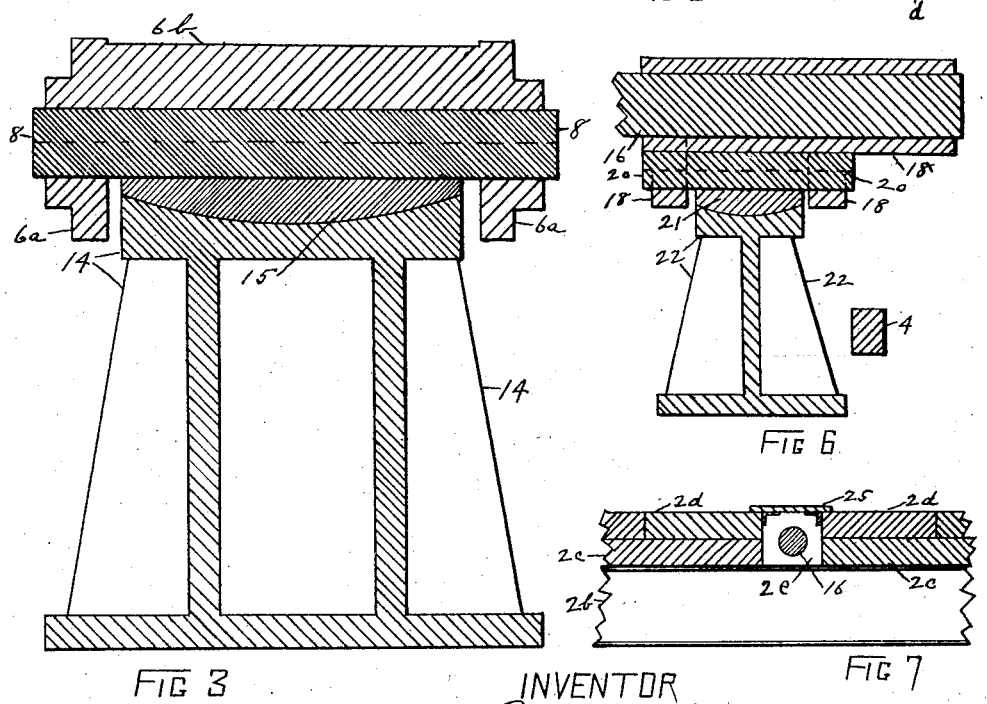

UNITED STATES PATENT OFFICE.

GUSTAVE WENZELMANN, OF GALESBURG, ILLINOIS.

SCALE.

1,419,336. Specification of Letters Patent. Patented June 13, 1922.

Application filed August 4, 1919. Serial No. 315,354.

*To all whom it may concern:*

Be it known that I, GUSTAVE WENZELMANN, a citizen of the United States, residing at Galesburg, in the county of Knox and State of Illinois, have invented certain new and useful Improvements in Scales.

This invention relates to scales for general weighing requirements, such as warehouse and railroad track scales and scales for weighing loaded wagons and trucks, live stock, farm products, etc.

Its purpose is to provide a simple and reliable form, arrangement, combination and manner of installation of the usual weight-sustaining and weight-indicating levers and fulcra, and to provide for rendering all of said parts easily accessible.

A further purpose is to provide equalizing, self-adjusting bearings for the support of the scale platform, one object being to distribute the weight as evenly as possible over the whole of each bearing, thus avoiding undue strain and wear on parts of same.

For the purpose of illustrating the principle of my improvements, I have shown their application to a wagon scale. Similar application of my invention may be made to many other types of scales, as indicated above.

In the accompanying drawings, Fig. 1 is a general top view of a wagon scale embodying my improvements, all of the working parts being shown uncovered. Fig. 2 is a longitudinal, vertical, sectional view of the end portion of one of the main levers, showing the fulcrum on which it is supported and the manner of suspension of one corner of the main platform, said section being taken on line $a$—$a$ of Fig. 1. Fig. 3 is a vertical cross-sectional view on line $b$—$b$ of Figs. 1 and 2. Fig. 4 is a vertical cross-sectional view on line $c$—$c$ of Figs. 1 and 2. Fig. 5 is an outside elevation of the inner end portions of a pair of the main levers and of an intermediate lever and its fulcrum, certain parts being cut away, as indicated by section lines, to show the details of lever suspension. Fig. 6 is a vertical cross-sectional view on line $d$—$d$ of Fig. 5, and Fig. 7 is a vertical, longitudinal, sectional view on line $e$—$e$ of Fig. 1.

Each part is always designated by the same reference character, wherever shown or mentioned in the drawings and specification.

A frame, 1, forms an inclosure within which the scale is set. 2 is the platform or floor of the scale, upon which objects or loads to be weighed are placed. This platform consists of planks, $2^d$, laid crosswise on sleepers $2^c$, securely mounted upon longitudinal beams $2^b$, the ends of which are attached to and adapted to be supported by angle bars $2^a$, $2^a$, which extend transversely of platform 2, at the respective ends thereof, and project somewhat beyond each side of said platform, providing four points of support for same, as hereinafter explained. 3, 4, 5 and 6 are the main levers of the scale, so arranged and formed that they are fully interchangeable. Each of these main levers has its outer end forked, as at $3^a$, $4^a$, $5^a$ and $6^a$, and, as they are identical and identically equipped, one of them, $6^a$, shown in Figs. 2, 3 and 4, is taken for illustration and description of all. The two branches $6^a$ are connected by bridge $6^b$ and are provided with square openings, in which are firmly seated, at right angles to the central longitudinal vertical plane of lever 6, the square hardened steel pins 7 and 8, so placed that a diagonal of each square pin is in a substantially vertical plane, and so arranged that the upper corner of square pin 7 and the lower corner of pin 8 are parallel to and substantially in a horizontal plane with each other. It will be observed that bridge $6^b$ is so placed and constructed that it engages the upper half of square pin 8, thereby increasing the rigidity of same while leaving the lower half of it exposed between branches $6^a$, $6^a$. Resting upon the upper square corner of hardened steel pin 7 are two washers, 9, whose bottom surfaces are cylindrically concave, as shown. The top of each washer 9 is provided with a centrally located semicircular groove, $9^a$, extending transversely of the washer and adapted to form a seat for the central portion of U-bolt 10, whose ends hang downward, one passing on each side of its washer 9 and pin 7. A hanging washer 11 is provided, having four holes adapted to receive the ends of U-bolt 10 and its mate of the same number and to be adjustably suspended on said two U-bolts 10 by means of nuts $10^a$ on same. Washer 11 is also provided with a centrally located transverse groove $11^a$, semicircular in form, seating the central part of U-bolt 12, the ends of which hang downward on opposite sides of washer 11, extending through the adjacent projecting end of angle $2^a$ and the parts attached thereto and being provided with nuts $12^a$, $12^a$ and washers $12^b$, $12^b$ adapted to hold angle $2^a$ and the parts attached thereto adjustably suspended by the flexible hanger composed of said U-bolt 12, washer 11, U-bolts 10, 10 and washers 9, 9, whose lower concave surfaces engage and are supported by the upper square corner of hardened steel pin 7, as above described. The flexibility of this hanger is obtained by the freedom of washers 9 to rock or vibrate on the edge of pin 7 and by the freedom of U-bolts 10, 10 and 12 to swing on their bearings in washers 9, 9 and 11. For the purpose of reinforcing the ends of angles $2^a$, each of these projecting ends is provided with angle irons 13, $13^a$ securely bolted or riveted to said angle $2^a$. The holes to receive U-bolt 12 are slotted, as shown, to provide for any slight variation in the position of said U-bolt relatively thereto. The upward extending flange of angle $2^a$ is cut off taperingly, as required, to allow it to hang freely under branch $6^a$ of lever 6.

A fulcrum post 14 is securely set on a suitable foundation under the center of square pin 8 of main lever 6, and is provided with a bearing washer 15, whose upper surface is cylindrically concave and adapted to engage the lower square corner only of hardened steel pin 8, allowing pin 8 and the main lever to which it is attached to rock slightly upon said square corner. The lower side of washer 15 is cylindrically convex transversely of the concavity of its surface, and is seated in a corresponding concavity of the upper end of fulcrum post 14, as shown. Lugs $15^a$, $15^a$ project downwardly from the edges of washer 15, being adapted to prevent said washer from slipping off from post 14.

Slot $2^e$, in platform 2, affords ample space for the installation of transverse lever bar 16 and for the necessary movements of same. Bar 16 is so placed as to touch no part of platform 2 or of its supporting beams $2^b$ or sleepers $2^c$, and has no bearing thereon nor connection therewith. The ends of lever bar 16 project beyond the respective sides of platform 2 and are there provided with firmly attached heads 17 and 18, from which extend arms $17^a$, $17^b$, $18^a$ and $18^b$, all of which project on the same side of bar 16, in alignment with each other. Each of these four arms is provided with an upwardly projecting, conical lug, that on arm $18^b$ being shown at $18^d$ in Fig. 5. A hanger link 19, having internal spherical-shaped concave surfaces at $19^a$ and $19^b$, is placed on arm $18^b$ so that a central portion of concave surface $19^a$ engages and rests upon the point of lug $18^d$, and the point of a similar concave lug, $4^b$, on the under side of lever 4 near its inner end, is caused to engage and rest upon a central portion of concave surface $19^b$. Arms $17^a$, $17^b$ and $18^a$ are respectively connected, by means of similar hangers 19 and in the same manner, with the corresponding main levers 3, 5 and 6, each of which is provided with a conical bearing lug similar to $4^b$ on lever 4.

Thus main levers 3, 4, 5 and 6 are respectively suspended near their inner ends from arms $17^a$, $18^b$, $17^b$, and $18^a$, each of which arms is so placed as to be directly above its corresponding main lever. The points of suspension of main levers 3, 4, 5 and 6, at their inner ends, are all equally distant from the lower square corners of their respective steel pins 8 and are all so placed as to be in horizontal alignment with each other transversely of the scale at its central point.

On the lower side of head 18 is firmly attached a square hardened steel pin 20, shown by dotted lines in Fig. 6, in a position similar to that of pins 8. The lower square corner of pin 20 engages and is supported by fulcrum washer 21 on post 22, which is set on any suitable foundation. Head 17, at the other end of transverse bar 16, is equipped and supported in the same way as head 18, the lower square corner of steel pin 20 and of the corresponding steel pin under head 17 being in strict alignment with each other, thus permitting lever bar 16 and the parts attached thereto to rock laterally of said bar 16, upon said corners of steel pins 20, under heads 17 and 18.

The conical lugs on arms $17^a$, $17^b$ and $18^a$, and conical lug $18^d$, on arm $18^b$, are all in alignment with each other and at an equal distance from the line of the lower square corners of steel pins 20, under heads 17 and 18, the said lower corners and the points of said conical lugs $18^d$ et al. all lying substantially in one horizontal plane. Conical lugs $18^d$ et al., on arms $17^a$, $17^b$, $18^a$ and $18^b$, and conical lugs $4^b$ et al., under main levers 3, 4, 5 and 6, are all in or substantially in the transverse vertical plane at the center of the scale.

Arm $18^c$ is an extension of arm $18^b$, beyond lug $18^d$. The under side of arm $18^c$, near the end thereof, is provided with conical lug $18^e$, adapted to engage with and be supported by the concave surface of hanger 23, which is extended above arm $18^c$, forming link 24, of suitable length and form for attachment to a graduated scale beam, hung in the usual manner above the scale frame.

A cover, 25, easily removable, closes slot $2^e$, in platform 2, not touching nor interfering in any way with lever bar 16 or any of the parts attached to same. Covers of any suitable material and design are intended to be placed over the main levers, fulcra, etc., which are shown without covers in the drawings. Such covers may be hinged to frame 1 and arranged to close all the open spaces around platform 2, within said frame 1, but not resting upon or in any way interfering with platform 2 or any of the scale levers and connections.

It will be readily understood that lever bar 16 with heads 17 and 18 and the arms extending therefrom, including arm 18$^c$, forms a compound intermediate lever, through which any weight acting upon main levers 3, 4, 5 and 6, or upon one or more of said levers, will be proportionally applied to link 24 and through said link, to the scale beam.

It is, of course, necessary that main levers 3, 4, 5 and 6, arms 17$^a$, 17$^b$, 18$^a$ and 18$^b$ and extension arm 18$^c$ be so proportioned, as to relation of distance of weight and power from fulcrum, that they will cause the scale beam used to indicate the true weight of the load placed upon scale platform 2, said scale beam being poised in the usual manner.

The main levers, 3, 4, 5 and 6, of my device, are, as already explained, identical in length and in every detail, making them interchangeable. A vertical plane through the longitudinal center of either of these levers, in the position in which they are used, divides it into halves, which are right hand and left hand but otherwise identical. This vertical plane and the corresponding vertical planes of the other main levers are substantially parallel to the lateral edges of platform 2, when the scale is properly assembled.

Main levers 3 and 4 are set farther than levers 5 and 6 from the edge of platform 2, allowing the inner ends of levers 3 and 5 and of levers 4 and 6 to pass each other and providing sufficient space between said inner ends for independent connection of each of said inner ends with its corresponding arm 17$^a$, 17$^b$, 18$^a$ or 18$^b$.

The four fulcrum washers 15 and the two fulcrum washers 21 are of similar form, as shown. The concave seats in which they rest on posts 14 and posts 22 permit adjustment automatically of the upper concave surfaces of said fulcrum washers to give the fullest possible contact and support to the parts resting upon them.

The weight-carrying bearings on steel pins 7 of main levers 3, 4, 5 and 6 are each provided with a compound hanger, as shown in Figs. 1 and 2, as already described. The two washers 9, used in this compound hanger instead of one long washer, give a better distribution of the weight on square pin 7 and a more complete contact of the bearing surfaces upon the upper square corner of steel pin 7. The latter fact also distributes the natural wear more evenly over the entire length of the contact surfaces of washers 9 on pin 7, thereby diminishing the amount of said wear and assisting in maintaining proper conditions for accurate weighing.

U-bolts 10, seated in grooves 9$^a$ on washers 9, and supporting hanging washer 11, carrying U-bolt 12 and thereby supporting one end of platform supporting member 2$^a$, provide a hanger of great flexibility and adjustability. One such compound hanger being used at each corner of platform 2, the entire platform is thereby suspended in a most effective and satisfactory manner. This allows a load, placed upon any part of platform 2, to exert its full effect upon pins 7 of levers 3, 4, 5 and 6, in proportion to the distance of said load from each of said pins, the aggregate of said effect being always the same whatever the position of the load upon said platform.

The load on platform 2 acts upon main levers 3, 4, 5 and 6 through the hangers suspended on pins 7, pulling downward on same and causing the inner ends of said main levers to pull downward proportionally on arms 17$^a$, 17$^b$, 18$^a$ and 18$^b$ through hangers 19. The downward pull on each and all of these arms, acting cumulatively upon the compound intermediate lever of which they are parts, is transferred proportionally, through extension arm 18$^c$, as a downward pull on hanger 23 on link 24, being thereby applied to the scale beam and making it possible to determine the weight of the load in the usual manner.

In most of the scales heretofore made the levers, fulcra and connections have been placed beneath the platform, where they are not readily accessible, and where they are more subject to interference on account of the natural tendency of the pit in which they are placed to become partly filled with dirt. By my construction, made possible by the new devices which I have invented, as herein revealed, all of the levers, fulcra and connections are placed where they can be readily inspected and easily kept in condition to function properly.

What I seek to secure by Letters Patent follows.

Claims.

1. A device of the character described comprising a scale platform and a set of main supporting levers for same, said levers and their fulcra being placed entirely exterior to the space occupied and covered by said platform; and, in combination with said platform and main levers, a compound intermediate lever, and a main connecting bar for the same, there being a slot in and across said platform, above the supporting beams thereof, adapted to provide space for the installation of said main connecting bar and to permit the removal of the same.

2. The structure specified in claim 1, the arms, fulcra, bearings and connections of said compound intermediate lever being also placed entirely exterior to the space occupied and covered by said platform.

3. In a weighing scale, a platform, main levers adapted to support same and flexible means for suspending said platform from said levers, each of said flexible suspending means consisting of two bearing washers resting upon the platform supporting bearing of a main lever, a U-bolt hanging over each of said washers and seated transversely upon the central portion of same, a third washer adjustably suspended upon the downwardly projecting ends of said two U-bolts, a third U-bolt hanging over said third washer seated transversely upon the central portion thereof, the ends of said third U-bolt projecting downward from said third washer and supportingly engaging a supporting member of said platform.

4. A device of the character described comprising a scale platform, provided with a transverse supporting member at each end, each of said supporting members extending beyond both sides of said platform; platform suspending means adapted to be applied to each of said extending portions, said platform suspending means comprising four main levers placed parallel with the lateral edges of the said platform, two on each side, entirely exterior to the space occupied and covered by said platform, each of said main levers lying across and above one of the said extending portions of said transverse supporting members, being fulcrumed at its outer end somewhat beyond said adjacent extending portion and having its weight-supporting bearing directly above the same; and, in combination with the foregoing, flexible means for suspending each of said extending supporting means from the weight-supporting bearing of its superposed main lever, each of said flexible suspending means consisting of two bearing washers resting upon said supporting bearing of a main lever and means for flexibly suspending the scale platform therefrom.

5. The structure specified in claim 4, said platform suspending means comprising a U-bolt hanging over each of said bearing washers and seated transversely upon the central portion of same; a third washer adjustably suspended from the downwardly projecting ends of said two U-bolts; a third U-bolt hanging over said third washer, seated transversely upon the central portion thereof, the ends of said third U-bolt projecting downward from said third washer and supportingly engaging the underlying extending portion of said transverse platform supporting means.

6. A device of the character described comprising a scale platform and a set of supporting levers for same, said levers and their fulcra being placed entirely exterior to the space occupied and covered by said platform; and, in combination therewith, a compound intermediate lever comprising a bar lying transversely across and not connected with nor touched by said platform but extending beyond both edges thereof, a head firmly mounted on each extending end portion of said bar, a fulcrum bearing on the under side of each of said heads, said fulcrum bearings being in strict alignment with each other; and a fulcrum post under each of said fulcrum bearings.

7. The structure specified in claim 6, said compound intermediate lever being provided with four arms, two of which extend laterally from each of said heads, each of said arms being placed directly above the inner end portion of one of said main levers and being provided with flexible means adapted to suspend said main lever from said intermediate lever arm, all of said arms being in horizontal alignment with each other and each of said arms and of the main lever inner ends being provided with suitable bearing points, all of which lie substantially in the same vertical transverse plane at the center of the scale.

8. The structure specified in claim 7 and, in combination therewith, an extension of one of said arms of the intermediate lever adapted to engage and be supported by a hanger suspended from the short end of a scale beam in the usual well known manner.

9. The structure specified in claim 6, there being a transverse slot in said scale platform adapted to provide suitable space for the free installation from above of said transverse bar of the compound intermediate lever, said slot being provided with a removable cover.

In testimony whereof I affix my signature this 2" day of August, A. D. 1919.

GUSTAVE WENZELMANN.